US012781874B2

(12) United States Patent
Werner et al.

(10) Patent No.: US 12,781,874 B2
(45) Date of Patent: Nov. 3, 2026

(54) COMBINED MEASURING AND REGULATING DEVICE FOR A FLUID FLOWING THROUGH A FLUID LINE

(71) Applicant: SenseGuard GmbH, Düsseldorf (DE)

(72) Inventors: Kai Werner, Neuss (DE); Dirk Bergers, Düsseldorf (DE); Daniel Radermacher, Düsseldorf (DE); Christophe Soulard, Uccle (BE)

(73) Assignee: SENSEGUARD GMBH, Düsseldorf (DE)

( * ) Notice: Subject to any disclaimer, the term of this patent is extended or adjusted under 35 U.S.C. 154(b) by 0 days.

(21) Appl. No.: 19/103,349

(22) PCT Filed: Aug. 11, 2023

(86) PCT No.: PCT/EP2023/072318

§ 371 (c)(1),
(2) Date: Feb. 12, 2025

(87) PCT Pub. No.: WO2024/037986

PCT Pub. Date: Feb. 22, 2024

(65) Prior Publication Data

US 2026/0049672 A1 Feb. 19, 2026

(30) Foreign Application Priority Data

Aug. 15, 2022 (DE) ..................... 10 2022 120 520.7

(51) Int. Cl.

*F16K 37/00* (2006.01)
*F16K 31/53* (2006.01)
*G01F 1/66* (2022.01)
*G01F 15/14* (2006.01)

(52) U.S. Cl.

CPC .......... *F16K 37/005* (2013.01); *F16K 31/535* (2013.01); *G01F 1/662* (2013.01); *G01F 15/14* (2013.01)

(58) Field of Classification Search

CPC ............................. F16K 37/005; F16K 31/535

See application file for complete search history.

(56) References Cited

U.S. PATENT DOCUMENTS

| | | | | |
|---|---|---|---|---|
| 10,401,205 | B2 * | 9/2019 | Poque | G01F 15/005 |
| 2017/0152648 | A1 | 6/2017 | Hammond et al. | |
| 2019/0113376 | A1 | 4/2019 | Skallebaek et al. | |
| 2021/0318699 | A1 * | 10/2021 | Shakudo | G05D 7/0652 |
| 2021/0381207 | A1 | 12/2021 | Brotherton et al. | |
| 2021/0404154 | A1 | 12/2021 | Manning et al. | |

FOREIGN PATENT DOCUMENTS

| | | |
|---|---|---|
| EP | 3 832 265 | 6/2021 |
| WO | 2023/061618 | 4/2023 |

OTHER PUBLICATIONS

International Search Report issued Nov. 17, 2023 in International (PCT) Application No. PCT/EP2023/072318.

* cited by examiner

*Primary Examiner* — P. Macade Nichols
(74) *Attorney, Agent, or Firm* — Wenderoth, Lind & Ponack, L.L.P.

(57) ABSTRACT

This invention relates to a combined measuring and regulating device (1) for a fluid flowing through a fluid line (2), comprising a measuring device (3) and a regulating device (4), wherein the total length (5) of the device (1) along the longitudinal axis (6) of the device (1) is a maximum total length, in particular at most 100 mm to 120 mm, preferably at most 110 mm.

14 Claims, 2 Drawing Sheets

Figure 1:
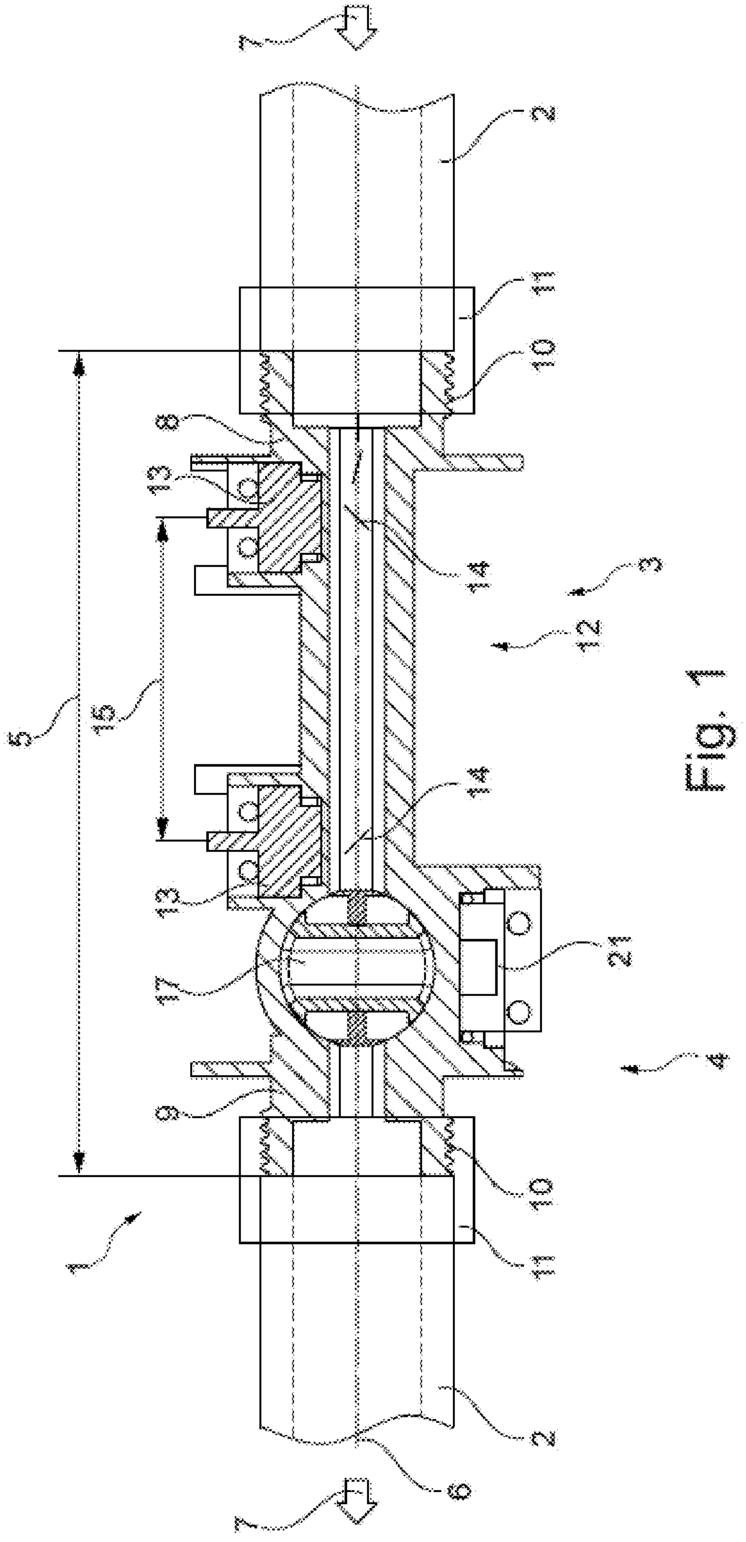

COMBINED MEASURING AND REGULATING DEVICE FOR A FLUID FLOWING THROUGH A FLUID LINE

This invention relates to a combined measuring and regulating device for a fluid flowing through a fluid line. The fluid line is in particular a water line, through which water flows, which is installed in a building and which connects a water source, for instance from a fluid supplier or a public utility company, in particular a water supplier, to a water outlet, for example a sanitary faucet, a dishwasher, a washing machine, a hot-water heater, a boiler or the like.

Individual measuring devices for a fluid flowing through a fluid line are known. If the fluid in question is water, these can be referred to as water meters. The known individual measuring devices permit measuring, counting or recording the water consumption of a consumption unit, in particular a residential unit, for instance a single-family home or an apartment. Individual measuring devices for a fluid flowing through a fluid line measure the volume and/or the volume flow of the fluid quantity passing through or flowing through. For the use of individual measuring devices in commercial transactions, for instance for the preparation of an invoice by a water supplier to its customers, it is necessary to calibrate the measuring devices in accordance with the legal requirements. The measurement of the volume and/or the volume flow of a fluid quantity passing through or flowing through a consumption unit provides the traceability and a documentation of the fluid consumption of the consumption unit on the basis of which potential savings of the fluid, in particular of water as a valuable environmental resource, can be determined.

Furthermore, individual regulating devices for a fluid flowing through a fluid line are known, for instance stopcocks or valves. The known individual regulating devices are used to regulate the flow through a fluid line, specifically the water supply, within a consumption unit, i.e., to release, limit or block it as required. Individual regulating devices allow the fluid line to be partially or completely shut off, for instance for maintenance work, in the event of technical defects, during droughts or dry periods or when the occupants of a residential unit are absent, in particular during a vacation period or after moving out. By limiting or blocking a fluid line, it is possible in particular to reduce or prevent an uncontrolled or dysfunctional water supply and thus minimize or avoid water damage to the structure and furnishings of buildings.

To be able to both measure and regulate a fluid flowing through a fluid line, the state of the art requires the installation of both an individual measuring device and an individual regulating device for a fluid flowing through a fluid line. In practice, this means that the two devices described must be used or installed separately from each other in the fluid line. However, this requires a correspondingly large installation space. This also requires a great deal of installation and maintenance work, as both devices have to be installed and maintained separately. If it is also intended that the individual measuring device and the individual regulating device are to exchange data or information with each other, i.e., in the case of an intended interaction between an intelligent individual measuring device and an intelligent individual regulating device, it is also necessary to provide a corresponding infrastructure, for instance by means of hoses, cables or bus lines. This increases the complexity of the overall system and therefore increases the required installation space and the required installation length in addition to the susceptibility to defects and the installation and maintenance costs.

This invention therefore addresses the problem of at least partially solving the issue described above and, in particular, of providing a device which provides both the described measuring functionality and the described regulating functionality in a comparatively small installation space.

The problem which is addressed here is solved by a combined measuring and regulating device for a fluid flowing through a fluid line having the features of claim 1. Advantageous further embodiment will become apparent from each of the dependent claims.

A proposition is made for a combined measuring and regulating device for a fluid flowing through a fluid line. The combined measuring and regulating device comprises a measuring device and a regulating device. The total length of the combined measuring and regulating device along the longitudinal axis of the device is a maximum total length, in particular at most 100 mm to 120 mm, preferably at most 110 mm. This applies in particular to continuous flow rate $Q_3$=2.5 $m^3$/h and precision or requirement class R400 in accordance with MID certification (Measuring Instruments Directive, European Measuring Instruments Directive or its successor directive). The longitudinal axis of the device defines the direction of flow of the fluid through the device. The device according to the invention can be installed in a fluid line or arranged in a fluid line. The device according to the invention can be used in all known hot-water and cold-water pipe systems. In addition, the device according to the invention can be designed for a burst pressure of 16 bar.

The fluid line can be designed as a pipe or a hose. The device according to the invention can be installed in the fluid line. The fluid line device can be one-piece or bipartite. A one-piece fluid line must be cut open before installing the combined measuring and regulating device to create two sections of the fluid line. In this way, the device according to the invention can be subsequently installed into existing fluid lines or the device according to the invention can be retrofitted. A bipartite fluid line comprises two sections. The ends of the two sections facing the combined measuring and regulating device can each have a thread, in particular a male thread. The threads of the sections of the fluid line are each used to form a screw connection with the device according to the invention by means of a screw connection element, in particular a union nut. When installing the combined measuring and regulating device, the two sections of the fluid line are fluidically interconnected via the combined measuring and regulating device. Once the combined measuring and regulating device has been installed in the fluid line, the fluid can first flow through the first section of the fluid line, then through the combined measuring and regulating device and finally through the second section of the fluid line. The direction of flow of the fluid determines the inflow or inlet side and the outflow or outlet side of the device according to the invention.

The measuring device can be designed to measure, count or record the volume and/or the volume flow of a fluid or water quantity flowing therethrough. The measuring device can be an intelligent measuring device in that it comprises a sensor system in the form of at least one sensor and/or a controller which is designed to process the data from this sensor system. For instance, the intelligent measuring device can be designed to detect unexpected or sudden events or irregularities in relation to fluid consumption or water consumption. This can be used to detect faults or defects at an early stage.

The regulating device is designed to regulate the volume and/or the volume flow of a fluid or water quantity flowing therethrough, i.e., to optionally open, limit or block it. The regulating device can be an intelligent regulating device in that it comprises a sensor system in the form of at least one sensor and/or a controller, which is designed to process the data from this sensor system. For instance, the intelligent control device can be designed to react automatically to events detected by the measuring device, preferably without input from human users, by performing certain predefined actions. In this way, the combined measuring and regulating device according to the invention can react quickly to, for instance, technical defects and, if necessary, prevent or at least limit great water damage.

The measuring and regulating device according to the invention can comprise an intelligent measuring device and an intelligent regulating device. In that case, the measuring and regulating device according to the invention is an intelligent measuring and regulating device. The intelligent measuring and control device can feature state-of-the-art communication architectures and protocols. These include, for instance, the wired meter bus (M-Bus) system and the wireless meter bus (wM-Bus) system, both of which are open communication standards having a star topology and master and slave devices and are widely used, particularly in Europe. Other examples include the Open Metering System (OMS), which is a cross-manufacturer and cross-sector communication architecture for smart meters based on wM-Bus or M-Bus. The smart metering and regulation device also enables improved communication and information exchange with public utilities and private consumers. This indirectly leads to an improvement in water quality and reliability of the water supply.

The measuring and regulating device according to the invention provides both the described measuring functionality and the described regulating functionality within a single device. In other words, the device according to the invention combines the described measuring functionality and the described regulating functionality in one unit. Therefore, the measuring and regulating device according to the invention can completely replace the use of a separate individual measuring device and a separate individual regulating device.

In that the measuring and regulating device according to the invention has an overall length along its longitudinal axis of at most 110 mm and provides the described measuring and regulating functionalities within a single device or within a single unit the overall length required to provide the two functionalities described is effectively shortened compared to the solutions known thus far. By shortening the overall length, the required installation space of the device according to the invention is smaller compared to a series connection of a separate individual measuring device and a separate individual regulating device along the fluid line.

The measuring and regulating device according to the invention is a two-in-one solution compared to the previously known solutions in the form of individual measuring devices and individual regulating devices. Because, in the case of an intended interaction of a measuring functionality with a regulating functionality, for instance, hoses, cables or bus lines connecting an individual measuring device and an individual regulating device can be dispensed with, the overall installation and maintenance effort is also reduced. Furthermore, the device according to the invention reduces the number of flanges or connections that result between the unit and the fluid line when installing a unit in a fluid line, also reducing the potential risk of leaks at the flanges.

The measuring and regulating device according to the invention can comprise a control device. The control device can be a central control device designed to receive, store and process all data from the measuring device, in particular to generate or compute additional advanced data, and to monitor, manage, export and/or import and send the data and/or the additional advanced data to the control device. Additional advanced data comprises, in particular, action measures, commands, signals and/or key figures. All data can be used for comprehensive analyses of the fluid or water consumption of the consumption unit in question. In particular, qualitative and quantitative or relative and absolute analyses can be performed. As part of data monitoring, threshold values can be defined, which, if exceeded or undercut, can result in further measures being taken and/or additional advanced data, such as warnings, error messages, signals or key figures, being generated.

The measuring and regulating device according to the invention can comprise a printed circuit board (PCB), which can comprise an MID part and a non-MID part. The printed circuit board can comprise the control device. The MID part can comprise all MID-relevant components of the device according to the invention, i.e., components that are MID-certified and are set up to perform measurements according to MID, to support such measurements and/or to process data resulting from such measurements. In particular, the MID part can comprise a data memory, a processor and an antenna. The non-MID part can comprise all MID-irrelevant components of the device according to the invention, i.e., components that are not MID-certified or do not have to be MID-certified. In particular, the non-MID part can comprise a data memory, a processor and an antenna. The MID part and the non-MID part can be designed separately from each other, in particular structurally and/or energetically separated from each other, preferably physically, mechanically, electrically and/or logically separated from each other. This separation serves to prevent tampering and malfunctions, as the MID part always has to function faultlessly throughout its entire service life.

The measuring and regulating device according to the invention can have two connections, namely an inlet connection and an outlet connection. The inlet connection is designed to guide the fluid into the device and can be connected to the fluid line. The outlet connection is designed to route or guide the fluid out of the device and can be connected to the fluid line.

The measuring and regulating device according to the invention can comprise a housing. The housing can be dimensioned such that it encloses a substantial part of the device. The housing can have two feed-throughs, namely one feed-through for the inlet connection and one feed-through for the outlet connection. The housing protects the device from damage and tampering and protects human users of the device from injury.

The measuring and regulating device according to the invention can be designed to connect a fluid supplier to a fluid consumer, in particular a household. The measuring and regulating device can be arranged directly downstream of the first shut-off device or the first shut-off valve of the fluid consumer. In this configuration, the measuring and regulating device replaces a conventional water meter if it is MID-certified (Measuring Instruments Directive or its successor directive). Alternatively, the measuring and regulating device can be arranged directly downstream of a conventional water meter if the measuring and regulating device is not MID-certified.

According to an advantageous embodiment, the measuring device is designed to store measurement data, in particular with regard to volume, volume flow, pressure and/or temperature of a passing or flowing-water quantity and with regard to external or ambient temperature, to generate or compute additional advanced data, for instance action measures, commands, signals or key figures, on the basis of the measurement data, to monitor, manage, export and/or import the measurement data and/or the additional advanced data. The measurement data and the additional advanced data can be used for comprehensive analyses of the water consumption of the consumption unit in question. In particular, qualitative and quantitative or relative and absolute analyses can be performed. As part of data monitoring, threshold values can be defined, which, if exceeded or undercut, can result in further measures being taken and/or additional advanced data, such as warnings, error messages, signals or key figures, being generated.

In this way, irregularities in consumption can be determined and possible faults or defects, particularly in the fluid lines under consideration, can be identified or detected at an early stage. In this way, water damage can be kept to a minimum or even completely prevented. As part of data management, consumption and/or consumer profiles can be defined or created or generated on the basis of the data and/or additional advanced data or taught using artificial intelligence. This renders adapting the device according to the invention individually to individual consumer units, residential units or residents possible. As part of a data export and import, data can be output in a data format provided for this purpose and then input, for instance to transfer the individual consumption profile of a resident from the previous consumption unit to the new consumption unit when they move in or out. Data imported or input this way can be used to generate or teach new consumption and/or consumer profiles. The measuring device therefore offers a wide range of customizable functions.

According to a further advantageous embodiment, the measuring device comprises an ultrasonic measuring unit and the ultrasonic measuring unit comprises two ultrasonic transducers. The ultrasonic transducers each have a surface that is designed to transmit and receive ultrasonic pulses or ultrasonic pulse sequences. The ultrasonic measuring unit can have a measuring section that extends along the longitudinal axis of the device according to the invention, i.e., in the direction of flow of the fluid through the device according to the invention. One of the two ultrasonic transducers can be arranged at a first end of the measuring section and another of the two ultrasonic transducers can be arranged at a second end of the measuring section. The ultrasonic measuring unit is designed to measure the speed of the fluid flowing through the fluid line, in particular water, and thus its volume, its flow rate, its pressure and/or its temperature. The ultrasonic transducers are each designed to transmit and receive ultrasonic signals.

In order to measure the flow velocity of the fluid, ultrasonic pulses or ultrasonic pulse sequences are sent simultaneously from both ultrasonic transducers in the direction of the other ultrasonic transducer. The ultrasonic pulses or ultrasonic pulse sequences transmitted in this way, which are oriented in opposite directions, travel through the fluid from the transmitting ultrasonic transducer in the direction of the other, receiving ultrasonic transducer. If the direction of flow of the fluid is fixed for the moment of emission of the ultrasonic pulses or ultrasonic pulse sequences, this means that some ultrasonic pulses or ultrasonic pulse sequences continue in the direction of flow of the fluid and the other ultrasonic pulses or ultrasonic pulse sequences continue against the direction of flow of the fluid. After transmitting the ultrasonic pulses or ultrasonic pulse sequences, both ultrasonic transducers switch from transmission mode to receive mode. In receive mode, the ultrasonic transducers can receive ultrasonic pulses or ultrasonic pulse sequences. After receiving the two ultrasonic pulses or the two ultrasonic pulse sequences, they are compared with each other and the time delay between them is determined. Finally, the velocity of the fluid flowing through the fluid line can be computed on the basis of the time delay.

The distance between the ultrasonic transducers can define the measuring distance of the ultrasonic measuring unit. The hydraulic ultrasonic measurement is extremely precise and therefore suitable for measuring both large and small quantities of water, or more precisely volumes and/or volume flows of respective quantities of fluid or water. In addition, hydraulic ultrasonic measurement is independent of the conductivity, viscosity, temperature, density and pressure of the fluid and is therefore also robust against external influences that can alter the conductivity, viscosity, temperature, density and pressure of the fluid. In addition, hydraulic ultrasonic measurement does not require any mechanically moving parts and is therefore particularly durable and low-maintenance. The measuring section can be designed as a mirrored configuration. This extends the measuring distance and thus further increases the precision of the ultrasonic measurement.

According to a further advantageous embodiment, the ultrasonic measuring unit comprises two ultrasonic reflecting surfaces, also called ultrasonic mirrors, wherein the ultrasonic reflecting surfaces are arranged spaced apart from each other along the longitudinal axis of the device according to the invention. The two ultrasonic reflective surfaces can each be attached to a locking element, also known as a carriage. Alternatively, the two ultrasonic reflective surfaces can be integrally formed with the locking element, such that the two ultrasonic reflective surfaces are integral components of the locking element. The locking element can be made as a stamped part from sheet metal. The locking element facilitates the locking of the two ultrasonic reflective surfaces as well as their handling, assembly and disassembly. Each of the two ultrasonic reflecting surfaces is logically and, if necessary, spatially assigned to one of the two ultrasonic transducers. The ultrasonic reflective surfaces are designed to deflect the ultrasonic pulses or ultrasonic pulse sequences in their respective directions. In this way, it is possible to arrange the ultrasonic transducers spatially in different configurations inside the measuring device. The distance between the ultrasonic reflecting surfaces can define the measuring distance of the ultrasonic measuring unit.

According to a further advantageous embodiment, the ultrasonic reflecting surfaces are each made of stainless steel. Stainless steel as a material for the ultrasonic reflective surfaces offers a high degree of reflection, is corrosion-resistant and is comparatively inexpensive.

According to a further advantageous embodiment, the ultrasound-reflecting surfaces are each arranged at an angle of 45° to the longitudinal axis of the device according to the invention. This reduces the flow resistance of the fluid. At such an angle, in accordance with the laws of reflection, namely the angle of incidence and the angle of reflection are equal, and the angle between the longitudinal axis of the device according to the invention and the normal direction of the surface of the ultrasonic transducers emitting and receiving the ultrasonic pulses is 90°. As a result, the two ultrasonic transducers can be installed in the same orientation, which reduces manufacturing, installation and maintenance costs.

According to a further advantageous embodiment, the distance between the ultrasound-reflecting surfaces is 40 mm to 50 mm, in particular 44 mm. This applies in particular to continuous flow rate $Q_3$=2.5 $m^3$/h and precision or requirement class R400 in accordance with MID certification (Measuring Instruments Directive, European Measuring Instruments Directive or its successor directive). Prototype tests have shown that for $Q_3$=2.5 $m^3$/h and R400, a distance of 44 mm provides particularly good results with regard to the compromise between installation space requirements and measuring precision. The distance between the ultrasonic reflecting surfaces can define the measuring distance of the ultrasonic measurement. Thus, the overall length of the measuring and regulating device according to the invention can be effectively reduced along the longitudinal axis of the device according to the invention compared to a series of a known single measuring device and a known single regulating device, and at the same time the measuring path for the ultrasonic measurement can be comparatively long or large relative to the overall length of the device. This enables a particularly precise ultrasonic measurement at a comparatively small installation space requirement.

According to a further advantageous embodiment, the regulating device comprises a continuously adjustable or controllable valve. The valve is designed to open and close the fluid line in an infinitely variable manner, i.e., to release, limit or block the flow through the fluid line in an infinitely variable manner. In this context, the adjustment of the valve in an infinitely variable manner means that any adjustment of the valve between a fully open and a fully closed position, including the fully open and the fully closed position, is possible in terms of design and geometry. The regulating device can be an intelligent regulating device having at least one sensor that is designed to measure the position, motion and/or acceleration of the valve or components thereof.

According to a further advantageous embodiment, the regulating device comprises an electric motor. The electric motor can be designed to actuate the valve, i.e., to open and close it. The regulating device can be an intelligent regulating device having at least one sensor that is designed to measure the position, motion and/or acceleration of the electric motor or components thereof.

According to a further advantageous embodiment, the regulating device comprises a transmission, wherein the valve and the electric motor are kinematically interconnected via the transmission. The transmission can comprise gears. The transmission improves the torque and power transfer between the electric motor and the valve. The regulating device can be an intelligent regulating device having at least one sensor that is designed to measure the position, motion and/or acceleration of the transmission or components of the transmission.

According to a further advantageous embodiment, the regulating device can be controlled telemetrically. The regulating device can comprise a receiver unit, which is designed to receive control signals, for instance release signals or opening signals, limiting signals or closing signals with a percentage indication of a release or blocking or blocking signals, in particular in the form of infrared or radio signals. The control signals can be generated by an algorithm, an artificial intelligence, a human user or a utility company.

According to a further advantageous embodiment, the device according to the invention comprises a temperature sensor, which is designed to measure the ambient temperature of the device or the outside temperature and/or the fluid temperature. The temperature sensor can be designed for a measuring range of (minus) −10° C. to (plus) +75° C. A temperature sensor designed in this way is also suitable for particularly low and particularly high temperatures. The temperature sensor can be designed as a separate sensor. Alternatively, the temperature sensor can be designed as an integrated function inside the measuring device, wherein the temperature can be computed via the measuring path of the ultrasonic measurement.

According to a further advantageous embodiment, the device according to the invention comprises a pressure sensor. The pressure sensor is designed to measure the fluid pressure both in the inlet direction and in the return direction of the fluid line. The pressure sensor can be designed for a measuring range from (zero) 0 bar to 10 bar. A pressure sensor designed in this way is also suitable for particularly high fluid pressures. The pressure sensor can be designed to measure the supply pressure of the fluid. This sensor data can be used to detect leaks in the fluid line and/or to protect sanitary units downstream of the device according to the invention from damage due to excessive pressure.

According to a further advantageous embodiment, the device according to the invention comprises two storage units for electric energy, namely a first electric storage unit and a second electric storage unit. The first electric storage unit is designed to supply electric energy to the measuring device, in particular to provide the electrification of MID functionalities (Measuring Instruments Directive, European Measuring Instruments Directive or its successor directive) of the measuring device, preferably to calibrate the measuring device. The first electric storage unit can be a battery having a long operating time. Preferably, the first electric storage unit is designed to supply the measuring device with electric energy over a period of 6, 16 or 20 years. The first electric storage unit can be designed in such a way that the operating time is guaranteed without recharging. This makes for a particularly durable and reliable measurement.

The second electric storage unit is designed to supply the regulating device or subsystems of the regulating device, in particular the valve, the electric motor and/or the transmission or components thereof, with electric energy, in particular to provide the electrification of non-MID functionalities of the regulating device. Preferably, the second electric storage unit is designed to perform a telemetric and possibly automatic limitation or blocking of the fluid line, for instance if an irregularity has been detected in the data, if tenants or owners of a consumption or residential unit have moved out, if a bill issued by the utility company has not been paid or if a water shortage occurs during a prolonged drought or dry period. The second electric storage unit can be a rechargeable battery. This makes for a particularly flexible and reliable regulation.

This invention is explained in more detail below with reference to the figures. There, an advantageous embodiment of the invention is shown, wherein the invention is not limited to this advantageous embodiment. Identical components are always marked using the same reference numerals in the figures and are therefore only named or mentioned once. In detail FIG. 1 shows a semi-transparent, schematic side view of an embodiment of the device according to the invention, FIG. 2 shows a further semi-transparent, schematic side view of the embodiment of FIG. 1.

Figure 2:
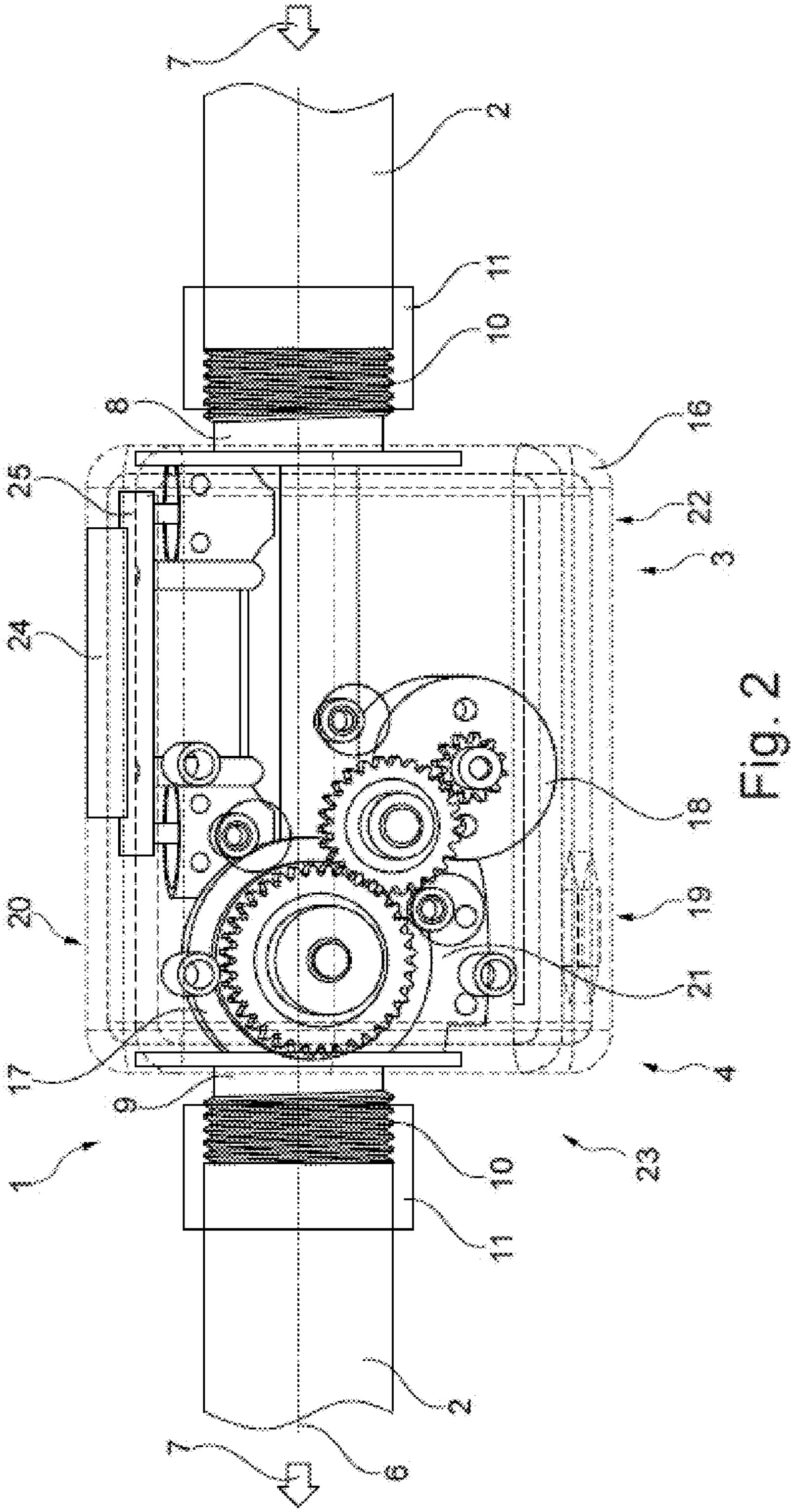

FIG. 1 shows a semi-transparent, schematic side view of an embodiment of the combined measuring and regulating device 1 according to the invention for a fluid flowing through a fluid line 2, for instance water. The device 1 comprises a measuring device 3 and a regulating device 4. The total length 5 of the device 1 along the longitudinal axis 6 of the device 1 is 110 mm. The longitudinal axis 6 of the device 1 and the longitudinal axis of the bipartite fluid line 2 coincide in the assembled state of the device 1, as shown in FIG. 1, i.e., after the device 1 has been installed or inserted into the fluid line 2.

The fluid flows through the device 1 in the direction of flow 7, from right to left in FIG. 1. At its two ends along the longitudinal axis 6, the device 1 has a first connection 8, which is the inlet connection in flow direction 7, and a second connection 9, which is the outlet connection in flow direction 7.

Fluid line 2 is a water-conveying pipe that has been cut open for the purpose of installing the device 1, resulting in two sections of fluid line 2. The two necks 8, 9 each have a male thread 10. The two ends of the two sections of the fluid line 2 facing the device 1 each have a union nut 11. The union nuts 11 can each be screwed onto the assigned male thread 10. A sealing element in the form of a flat gasket is arranged at each of the two connection points created in this way, i.e., on the end face between the fluid line 2 and the device 1, to ensure a fluid-tight and leak-free fluid connection between the fluid line 2 and the device 1.

The measuring device 3 is designed to store measurement data, to generate additional advanced data based on the measurement data, to monitor, manage, export and import the measurement data and the additional advanced data.

The measuring device 3 comprises an ultrasonic measuring unit 12. The ultrasonic measuring unit 12 comprises two ultrasonic transducers 13 and two ultrasonic reflecting surfaces 14 made of stainless steel, wherein the ultrasonic reflecting surfaces 14 are arranged spaced apart from each other along the joint (in the assembled state) longitudinal axis 6 of the device 1 and the fluid line 2. The ultrasonic reflective surfaces 14 are each attached to a locking element and are each arranged at an angle of 45° to the longitudinal axis 6 of the device 1. The ultrasound-reflecting surface 14 on the upstream end has a flow-optimized configuration in that it comprises a flow-optimized shape and comprises at least one flow guide surface upstream with respect to the flow direction 7. The two ultrasonic transducers 13 are also spaced apart along the common longitudinal axis 6 and are each oriented at 90° to the longitudinal axis 6. The ultrasonic reflecting surfaces 14 define a distance 15 between them. This distance is 44 mm for $Q_3$=2.5 $m^3$/h and R400. The distance 15 between the two ultrasonic reflecting surfaces 14 is equal to the distance between the two ultrasonic transducers 13 and defines the measuring distance for the ultrasonic measurement.

FIG. 2 shows a further semi-transparent, schematic side view of the embodiment of FIG. 1, which side view shows additional components of the device 1 compared to FIG. 1. The device 1 comprises a housing 16, which encloses a substantial part of the device 1. The housing 16 serves to protect the device 1 from damage and tampering and to protect human users of the device 1. The housing has a feedthrough for the first connection piece 8 and for the second connection piece 9.

The regulating device 4 comprises a continuously adjustable valve 17 and an electric motor 18. The regulating device 4 also comprises a transmission 19 having gears, wherein the valve 17 and the electric motor 18 are kinematically interconnected via the transmission 19 by means of its gears.

The regulating device 4 can be controlled telemetrically. For this purpose, the regulating device 4 comprises a receiver unit that can receive control signals.

The device 1 comprises a temperature sensor 20, which is designed to measure the ambient temperature of the device 1 as well as the fluid temperature, i.e., the temperature of the fluid flowing through the device 1, in particular water.

The device 1 comprises at least one pressure sensor 21. The pressure sensor 21 is designed to measure the fluid pressure both in the inlet direction and in the return direction of the fluid line 2.

The device 1 further comprises a first storage unit for electric energy 22 and a second storage unit for electric energy 23. The first electric storage unit 22 is designed to supply the measuring device 3 with electric energy. The second electric storage unit 23 is designed to supply the regulating device 4 with electric energy.

Furthermore, the device 1 comprises a display device 24, which is designed to display essential information to the user. In addition, the device 1 comprises a printed circuit board 25, which has an MID part and a non-MID part that are separate from each other. The printed circuit board 25 comprises data memory, processors and antennas.

LIST OF REFERENCE NUMERALS AND TERMS

1 combined measuring and regulating device
2 fluid line
3 measuring device
4 regulating device
5 total length
6 longitudinal axis
7 direction of flow
8 first connection
9 second connection
10 male thread
11 union nut
12 ultrasonic measuring unit
13 ultrasonic transducer
14 ultrasonic reflecting surface
15 distance
16 body
17 valve
18 electric motor
19 transmission
20 temperature sensor
21 pressure sensor
22 first storage unit for electric energy
23 second storage unit for electric energy
24 display device
25 printed circuit board

The invention claimed is:

1. A combined measuring and regulating device (1) for a fluid flowing through a fluid line (2), comprising:
   a measuring device (3) comprising an ultrasonic measuring unit (12) having two ultrasonic transducers (13), and
   a regulating device (4),
   wherein the ultrasonic measuring unit (12) comprises two ultrasonic reflecting surfaces (14), wherein the ultrasonic reflecting surfaces (14) are arranged spaced apart from each other along a longitudinal axis (6) of the device (1), and
   wherein a total length (5) of the device (1) along the longitudinal axis (6) is a maximum total length of 110 mm to 120 mm.

2. The device (1) according to claim 1, wherein the measuring device (3) stores measurement data, generates additional advanced data on the basis of the measurement data, and monitors, manages, exports and/or imports the measurement data and/or the additional advanced data.

3. The device (1) according to claim 1, wherein the ultrasonic reflecting surfaces (14) are each made of stainless steel.

4. The device (1) according to claim 1, wherein the ultrasonic reflecting surfaces (14) are each oriented at an angle of 45° to the longitudinal axis (6) of the device (1).

5. The device (1) according to claim 1, wherein a distance (15) between the ultrasonic reflecting surfaces (14) is 40 mm to 50 mm.

6. The device (1) according to claim 1, wherein the regulating device (4) comprises a continuously adjustable valve (17).

7. The device (1) according to claim 6, wherein the regulating device (4) further comprises an electric motor (18).

8. The device (1) according to claim 7, wherein the regulating device (4) further comprises a transmission (19), wherein the valve (17) and the electric motor (18) are kinematically interconnected via the transmission (19).

9. The device (1) according to claim 1, wherein the regulating device (4) can be controlled telemetrically.

10. The device (1) according to claim 1, further comprising a temperature sensor (20), which is designed to measure an ambient temperature of the device (1) and/or a fluid temperature of the fluid flowing through the fluid line (2).

11. The device (1) according to claim 1, further comprising a pressure sensor (21), which is designed to measure a fluid pressure in an inlet direction and in a return direction of the fluid in the fluid line (2).

12. The device (1) according to claim 1, further comprising a first electric storage unit (22) and a second electric storage unit (23), wherein the first storage unit (22) supplies the measuring device (3) with electric energy, and the second storage unit (23) supplies the regulating device (4) with electric energy.

13. The device (1) according to claim 1, wherein the total length (5) of the device (1) along the longitudinal axis (6) is a maximum total length of 110 mm.

14. The device (1) according to claim 5, wherein the distance (15) between the ultrasonic reflecting surfaces (14) is 44 mm.

* * * * *